(12) United States Patent
Brück et al.

(10) Patent No.: US 8,684,032 B2
(45) Date of Patent: Apr. 1, 2014

(54) CONTAINER HAVING A DISCHARGE LINE FOR AN OPERATING LIQUID OF A MOTOR VEHICLE, METHOD FOR PRODUCING THE CONTAINER AND MOTOR VEHICLE HAVING THE CONTAINER

(71) Applicant: Emitec Gesellschaft Fuer Emissionstechnologie MBH, Lohmar (DE)

(72) Inventors: Rolf Brück, Bergisch Gladbach (DE); Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/670,898

(22) Filed: Nov. 7, 2012

(65) Prior Publication Data
US 2013/0061951 A1 Mar. 14, 2013

Related U.S. Application Data

(63) Continuation of application No. PCT/EP2011/056572, filed on Apr. 26, 2011.

(30) Foreign Application Priority Data

May 7, 2010 (DE) .......... 10 2010 019 700

(51) Int. Cl.
*B67D 7/78* (2010.01)
*B65D 37/00* (2006.01)

(52) U.S. Cl.
USPC .......... 137/587; 137/592; 251/144; 222/211; 222/464.5

(58) Field of Classification Search
USPC ......... 137/587, 592; 222/211, 464.5; 251/144
See application file for complete search history.

(56) References Cited

U.S. PATENT DOCUMENTS

| | | | |
|---|---|---|---|
| 2,174,354 A * | 9/1939 | Shields | 222/464.7 |
| 4,479,820 A | 10/1984 | Merk et al. | |
| 4,510,968 A | 4/1985 | Rau | |
| 5,052,437 A | 10/1991 | Danna | |

(Continued)

FOREIGN PATENT DOCUMENTS

| | | |
|---|---|---|
| DE | 27 50 081 A1 | 5/1979 |
| DE | 692 05 785 T2 | 6/1996 |

(Continued)

OTHER PUBLICATIONS

International Search Report of PCT/EP2011/056572, Date Jul. 19, 2011.

*Primary Examiner* — Craig Schneider
*Assistant Examiner* — Atif Chaudry
(74) *Attorney, Agent, or Firm* — Laurence A. Greenberg; Werner H. Stemer; Ralph E. Locher (57) ABSTRACT

A container for an operating liquid or fluid for a motor vehicle includes a container wall which delimits an interior space or chamber of the container. The container has a first wall section, a second wall section and at least one discharge line for discharging the operating liquid out of the container. The discharge line extends from the first wall section to the second wall section and can be adjusted in its length to a distance between the first wall section and the second wall section. A method for producing the container and a motor vehicle having the container are also provided.

7 Claims, 4 Drawing Sheets

(56) References Cited

U.S. PATENT DOCUMENTS

| | | | |
|---|---|---|---|
| 5,217,044 A * | 6/1993 | Schulte | 137/590 |
| 6,176,260 B1 | 1/2001 | Hahner et al. | |
| 2005/0016600 A1 | 1/2005 | Knaggs et al. | |
| 2009/0212076 A1 * | 8/2009 | Fertig | 222/333 |
| 2009/0308881 A1 | 12/2009 | Eulitz et al. | |
| 2011/0168280 A1 | 7/2011 | Krause et al. | |

FOREIGN PATENT DOCUMENTS

| | | |
|---|---|---|
| DE | 102004035098 A1 | 2/2005 |
| DE | 10 2008 041 723 A1 | 3/2010 |
| EP | 0 087 508 A1 | 9/1983 |
| EP | 0087509 A1 | 9/1983 |
| EP | 0 297 256 A2 | 1/1989 |
| WO | 2009149782 A2 | 12/2009 |

* cited by examiner

CONTAINER HAVING A DISCHARGE LINE FOR AN OPERATING LIQUID OF A MOTOR VEHICLE, METHOD FOR PRODUCING THE CONTAINER AND MOTOR VEHICLE HAVING THE CONTAINER

CROSS-REFERENCE TO RELATED APPLICATION

This is a continuation, under 35 U.S.C. §120, of copending International Application No. PCT/EP2011/056572, filed Apr. 26, 2011, which designated the United States; this application also claims the priority, under 35 U.S.C. §119, of German Patent Application DE 10 2010 019 700.9, filed May 7, 2010; the prior applications are herewith incorporated by reference in their entirety.

BACKGROUND OF THE INVENTION

Field of the Invention

The invention relates to a container for an operating liquid or fluid of a motor vehicle. Such containers (which are also referred to as tanks) are required in motor vehicles, for example for storing fuel for an internal combustion engine, for storing windshield washing water, for storing cooling liquid for an internal combustion engine and/or for storing reducing agent for addition into an exhaust gas treatment device. The invention also relates to a method for producing the container and a motor vehicle having the container.

Recently, exhaust gas treatment devices, in particular, have become more widespread. In such devices, a reducing agent is added to the exhaust gas of an internal combustion engine in order to reduce defined noxious constituent parts of the exhaust gas. In that context, a process which has already been used many times in exhaust gas treatment devices is to be highlighted, namely the process of selective catalytic reduction (SCR). In that process, nitrogen oxide compounds in the exhaust gas react with a supplied reducing agent to form harmless substances such as water, carbon dioxide or nitrogen. Ammonia is frequently used as a reducing agent for the SCR process. Ammonia is a hazardous substance and is therefore frequently not stored directly in a motor vehicle, but rather in the form of a reducing agent precursor. A reducing agent precursor of that type is, for example, a liquid urea/water solution. In the following text, reducing agent precursors are also referred to as reducing agents.

A tank or a container is required to store an aqueous solution of that type in a motor vehicle. Moreover, a device is required for discharging the reducing agent from the tank or container and for providing the reducing agent in an exhaust gas treatment device. Such components are to be constructed so as to be as inexpensive, space-saving and low-maintenance as possible. Moreover, the variety of variants of containers of that type and the compensation of manufacturing tolerances are to be the focus of the invention.

SUMMARY OF THE INVENTION

It is accordingly an object of the invention to provide a container having a discharge line for an operating liquid of a motor vehicle, a method for producing the container and a motor vehicle having the container, which overcome the hereinafore-mentioned disadvantages and at least partially alleviate the highlighted problems of the heretofore-known containers, methods and vehicles of this general type. In particular, the object is to propose an especially advantageous container for an operating liquid of a motor vehicle and, particularly, for a reducing agent for exhaust gas treatment.

With the foregoing and other objects in view there is provided, in accordance with the invention, a container for an operating liquid of a motor vehicle. The container comprises a container wall delimiting an interior space of the container. The container wall has a first wall section and a second wall section defining a spacing therebetween. At least one discharge line is configured to discharge the operating liquid out of the container. The at least one discharge line extends from the first wall section to the second wall section, the at least one discharge line has a length and the at least one discharge line is configured to adapt the length to the spacing between the first wall section and the second wall section.

In this case, an "operating liquid" means, in particular, a reducing agent which is liquid (at room temperature) and/or a reducing agent precursor which is liquid (at room temperature) for an exhaust gas treatment device in a motor vehicle. Otherwise, the container can of course be used, in particular, for the operating liquids which were mentioned at the outset.

The discharge of liquid operating liquid out of the container should take place in the vicinity of a floor of the container, in order to ensure that a discharge of operating liquid out of the container can take place independently of the filling level of the operating liquid in the container. In addition, an opening for discharging operating liquid out of the container can be disposed on an upper side of the container, in order to ensure that no undesired output of operating liquid out of the container takes place at the opening independently of the filling level of the operating liquid in the container. The operating liquid is also not to escape when the opening for discharging operating liquid out of the container is not closed. Since the opening is thus above the discharge point, a discharge line is provided for discharging operating liquid out of the container. Accordingly, the first wall section is preferably disposed in the vicinity of a floor or in a floor of the container. The second wall section is preferably disposed in the vicinity of an upper side or in the upper side of the container. By virtue of the fact that the discharge line extends from the first wall section to the second wall section, operating liquid can be removed from the container in the vicinity of the floor and can be conveyed out of the container through an opening which is disposed on the upper side of the container.

It is firstly advantageous for it to be possible for identical discharge lines to be used for different containers for operating liquid. This is achieved in this case by virtue of the fact that the length of the discharge line can be adapted to a spacing between a first wall section and a second wall section of the container. Different spacings between first wall sections and second wall sections in different containers can thus be compensated for by way of the (same) discharge line. Furthermore, containers can be deformed during operation, for example as a consequence of ageing. For example, the floor of a container can drop as a consequence of plastic flow of the container material. That would lead to an (unchangeable or rigid) discharge line then no longer reaching the floor of the container. In this case, the invention achieves a situation, for example, where the length of the discharge line is adapted to the ageing-induced deformation of the container. The adaptability of the length of the discharge line to a spacing between the first wall section and the second wall section also makes it possible that the discharge of operating liquid through the discharge line can continue to take place in the immediate vicinity of the first wall section during later operation, even in the case of a change in the spacing between the first wall section and the second section.

In accordance with another advantageous feature of the invention, a first receptacle for receiving the discharge line is disposed in the region of the first wall section, a second receptacle for receiving the discharge line is disposed in the region of the second wall section, and the first receptacle and the second receptacle are set up or configured for transmitting forces from the container wall to the discharge line. The first receptacle and the second receptacle on the container wall can be configured in such a way that corresponding receiving sections on the discharge line are connected form-lockingly and/or force-lockingly to the container wall. Forces are required to change the length of the discharge line. A form-locking connection is one which connects two elements together due to the shape of the elements themselves, as opposed to a force-locking connection, which locks the elements together by force external to the elements.

The first receptacle and the second receptacle can be set up or configured for transmitting these forces, which change the length of the discharge line, to the discharge line (directly and/or independently and/or during operation). Secondly, the adapted length of the discharge line can be maintained by a fixing device.

In addition, the length of the discharge line can be adapted, for example, (only) during the mounting of the container. After mounting, (additional) fixing of the length of the discharge line can take place. The length of the discharge line can therefore no longer be adapted during operation of the container in the case of this variant.

The discharge pipe which has its length adapted can then also transmit forces from the first wall section to the second wall section. Stiffening of the container can thus be achieved additionally.

Moreover, the (at least one) discharge line is thus suitable for containers with different geometries and different spacings between first wall sections and second wall sections.

The first receptacle and the second receptacle can be constructed in such a way that at least axial forces can be transmitted along the discharge line and/or transverse forces can be transmitted obliquely (in particular, perpendicularly) with respect to the discharge line, from the discharge line to the first wall section or the second wall section and vice versa. If the first receptacle and the second receptacle can absorb axial forces this, in particular, makes fixing or orientation of the first wall section and the second wall section with respect to one another possible. If the first receptacle and the second receptacle can absorb transverse forces this, in particular, makes precise positioning of the discharge pipe in the tank possible.

In accordance with a further advantageous feature of the invention, the container wall is formed of plastic and the discharge line is formed of metal. This means, in particular, that the main constituent parts are respectively formed of plastic and metal. The container is preferably produced by way of an injection molding process. Further possible production processes for the container are blow molding or the rotational melting process. In the blow molding process, the plastic for the container is fit to a hollow mold by air pressure, as a result of which the container wall is formed. In the rotational melting process, melted plastic is fit to a hollow mold by centrifugal forces, as a result of which the container wall is formed. Through the use of a process of this type, a particularly light container which can be produced inexpensively at least partially insulates the interior space thermally with respect to the exterior. Moreover, the shape of a container of this type can be adapted in an advantageous way to the installation space which is available in the motor vehicle. The discharge line which is formed of metal can also introduce heat into the interior space of the container in a targeted manner. At the same time, it is particularly stable and can absorb comparatively great forces.

In accordance with an added advantageous feature of the invention, the discharge line is disposed on the container wall in such a way that it can be locked and unlocked. The discharge line can preferably be removed from the container wall again, without damage, which would jeopardize its reuse, being produced on the container wall or the discharge line in the process. In this way, the discharge line can be removed from the container simply. This can be advantageous, for example, for maintenance work or cleaning work in the container.

In accordance with an additional feature of the invention, the discharge line has at least one corrugated section which serves to adapt the length of the discharge line. A corrugated section of this type provides a particularly simple possibility for realizing a flexible length of the discharge line. In the case where the discharge line is to be extended, the folds of the corrugated section can be pulled apart from one another (spacing of the folds increases with (regularly) simultaneous reduction of the fold height). Correspondingly, the folds of the corrugated section can be pressed together (spacing of the folds decreases with (regularly) simultaneous increase of the fold height) if shortening of the length of the discharge line is desired. As a consequence, the corrugated section can be constructed in a similar manner to a "dimensionally rigid" folding bellows. A corrugated section can be provided in a metallic discharge line.

In addition or as an alternative to a corrugation, a wall thickness can also be provided which is thinner than other sections of the discharge line, in order for it to be possible to change the length of the discharge line.

It is likewise possible, cumulatively or as an alternative, for at least one telescopic (or similarly deformable) section to be provided in the discharge line.

In a further structural variant, the discharge line can be produced at least in regions from a flexible material. The length of the discharge line can also be adapted in this way. In addition, it is possible for the discharge line to form a bow, loop, curve or the like at least in regions. There can thus be considerably higher flexibility. The discharge line can then change its length even without a significant local deformation of the discharge line or the material of the discharge line.

As an alternative or in addition, the discharge line can have, in regions, at least two legs which run in parallel. In this case, the discharge line can preferably branch into at least two legs. Outside a branched section with at least two legs which run in parallel, the discharge line is preferably configured with only one leg. The at least two separate legs can also possibly be joined together again. The individual legs can be configured with a smaller cross section than the remaining discharge line. The common cross section of the at least two legs which run in parallel preferably corresponds to the cross section of the discharge line outside the branched section.

In accordance with yet another feature of the invention, the discharge line has a first section with a first diameter and a second section with a second diameter, the second diameter is larger than the first diameter, and a delivery unit for the operating liquid is provided in the second section.

In particular, a delivery device for conveying operating liquid out of the container is then also integrated into the discharge line. In other words, the discharge line forms, with the delivery unit, one assembly which can be called a delivery device.

That is also to say, in other words, that this refinement relates to a container for an operating liquid for a motor vehicle, having a container wall which delimits an interior space of the container, with a first wall section and a second wall section and with at least one discharge line for discharging operating liquid out of the container with a length, the discharge line extending from the first wall section to the second wall section, and a housing being provided on the discharge line in the vicinity of the second wall section, in which housing a delivery unit for the operating liquid is situated, with it being possible for the length of the discharge line to be adapted, in the region of the housing and/or adjacent thereto, to a spacing between the first wall section and the second wall section.

In this case, the housing is formed by the second section with the second diameter. The housing or the second section of the discharge line can have a variable length and/or height. This has the advantage, for example, that the housing or the second section is not situated permanently in the wet region of the tank. The housing or the second section is regularly disposed particularly close to the top of the tank. Operating liquid is situated there only if the tank is filled to a relatively great extent. A flexible region is therefore not exposed permanently to the operating liquid. As a result, the discharge line can have a relatively high service life. In addition, the change in the shape and the length of the discharge line is regularly damped by the flow resistance of the operating liquid. This damping is reduced if the flexible region is not situated in the operating liquid.

As an alternative or in addition, the discharge line can have a variable length adjacent the housing. Overall, as a consequence, the housing and the discharge line can preferably jointly have their length adapted to a spacing between the first wall section and the second wall section.

With the objects of the invention in view, there is also provided a method for producing a container. The method comprises at least the following steps:
a) providing a container without a discharge line but with a container wall having a first wall section and a second wall section defining a spacing therebetween;
b) providing a discharge line with a variable length;
c) fixing the discharge line on the first wall section of the container wall;
d) adapting the variable length of the discharge line to the spacing between the first and second wall sections of the container wall; and
e) fixing the discharge line on the second wall section.

The method according to the invention makes it possible to use standardized discharge pipes for containers of different shapes.

The method is carried out at least during the mounting (in particular, in the specified sequence), but it can then be repeated completely or partially (optionally autonomously). Thus, for example, at least one repetition of step d) can take place following step e)—in particular, if the spacing of the two wall sections with respect to one another changes during the mounting or use of the container. An autonomous adaptation of the discharge pipe can then take place without external maintenance work (if a predefinable force on the discharge pipe is exceeded).

In addition, it is also possible for the length of the discharge line to be fixed (possibly again releasably) after step e), as a result of which the length of the discharge line is no longer variable. It can thus be achieved that the discharge line stiffens the container to a more pronounced extent between the first wall section and the second wall section. The fixing can take place, for example, by way of a clip which bridges and therefore stiffens a flexible section of the discharge line. It is also possible for a flexible section of the discharge line to be encapsulated and/or coated with an additional material and is thus stiffened.

In addition, it can also be provided that the fixing of the discharge line on the first wall section and/or on the second wall section is subsequently machined after step e). This can also include, for example, the formation of a non-releasable, in particular material-to-material or material locking and/or form-locking connection between the container wall and the discharge line.

The special advantages and refinements which are described for the method according to the invention can be transferred in an analogous way to the container according to the invention. The same applies to the special advantages and refinements which are described for the container according to the invention and can be applied and transferred to the method according to the invention.

With the objects of the invention in view, there is concomitantly provided a motor vehicle, comprising at least one operating liquid container according to the invention and a delivery unit configured to convey the operating liquid out of the container through the at least one discharge line.

A motor vehicle of this type preferably has an internal combustion engine and an exhaust gas treatment device. The operating liquid is preferably a reducing agent or a reducing agent precursor, by way of which the method of selective catalytic reduction can be carried out in the exhaust gas treatment device. The delivery unit (pump, line, valve, . . . ) is set up or configured for conveying the fluid operating liquid out of the container to the exhaust gas treatment device.

Other features which are considered as characteristic for the invention are set forth in the appended claims, noting that the features which are described individually in the claims can be combined with one another in any desired, technologically appropriate way and can be supplemented by explanatory facts from the description, with further embodiments of the invention being shown.

Although the invention is illustrated and described herein as embodied in a container having a discharge line for an operating liquid of a motor vehicle, a method for producing the container and a motor vehicle having the container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawings in detail and first, particularly, to FIGS. 1 to 6 thereof, there are seen many components which are denoted by the same designations and will therefore first of all be explained jointly herein.

FIGS. 1 to 6 in each case show a container 1 for an operating liquid or fluid 2. In each case the container 1 has one container wall 4 which encloses or delimits an interior space 5 of the container 1 and can have a viewing window 25. A discharge line 8 extends through the interior space 5 of the container from a first wall section 6 of the container wall 4 to a second wall section 7 of the container wall 4. The first wall section 6 is disposed at a spacing 10 from the second wall section 7. The discharge line 8 has a length 9. The length 9 corresponds substantially to the first spacing 10. The discharge line 8 has a first section 14 and a second section 16. The first section 14 has a first diameter 15 and the second section 16 has a second diameter 17. A delivery unit 18 for conveying operating liquid 2 out of the container 1 is situated in the discharge line 8 in the region of the second diameter 17, which is considerably larger than the first diameter 15. The first section 14 has a first length 28 and the second section 16 has a second length 29. The first length 28 is preferably at least twice as large (and particularly preferably at least four times as large) as the second length 29.

A first receptacle 11 for receiving the discharge line 8 is provided on the first wall section 6. A second receptacle 12 for receiving the discharge line 8 is provided on the second wall section 7.

The discharge line 8 according to FIGS. 1 to 4 has a corrugated section 13 in order to adapt the length 9 to the spacing 10.

Figure 1:
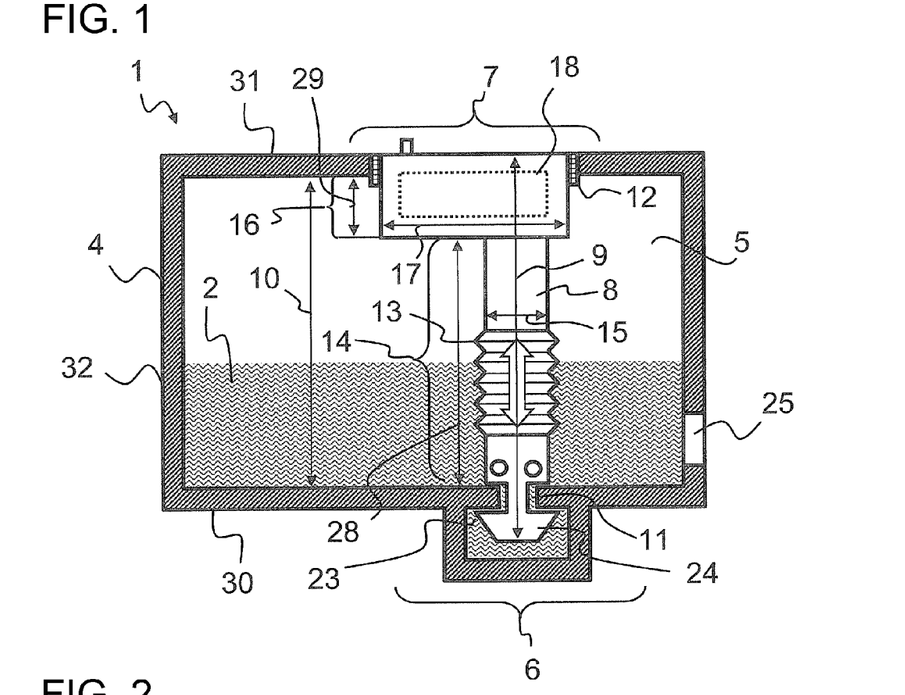
FIG. 1 is a diagrammatic, vertical-sectional view of a first structural variant of a container according to the invention.

FIG. 1 shows the first receptacle 11 in a sectional illustration and in a more detailed manner. The first receptacle 11 is configured in the manner of a groove 23 in the container wall 4. An anchor 24, which is provided on the discharge line 8, engages into the groove 23. According to FIG. 1, the corrugated section 13 is provided in the region of the first section 14 of the discharge line 8.

Figure 2:
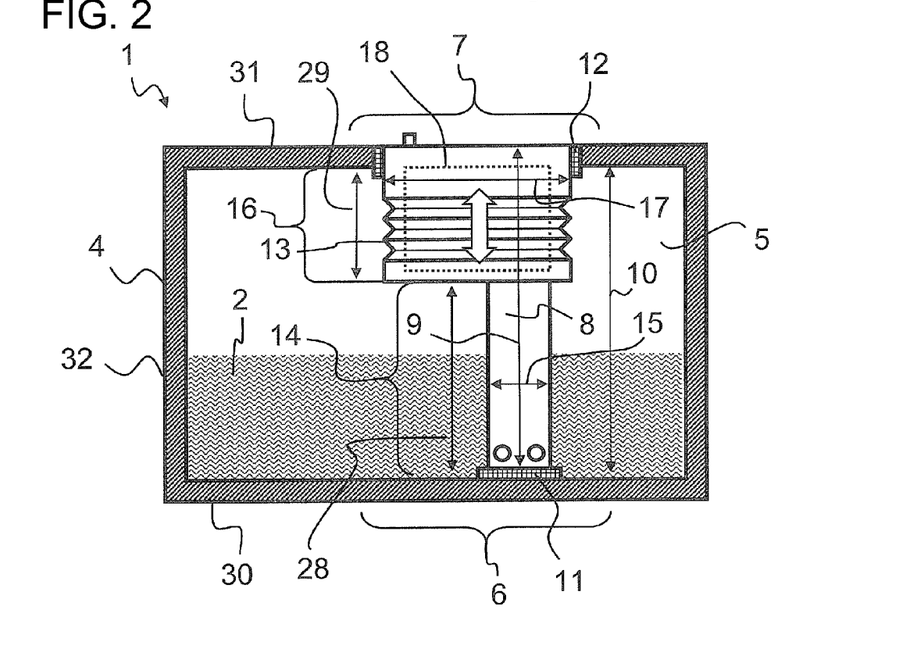
FIG. 2 is a vertical-sectional view of a second structural variant of a container according to the invention.

According to FIG. 2, the corrugated section 13 is provided in the second section 16 with the second diameter 17 and the second length 29 of the discharge line 8. In this region, the discharge line 8 forms a housing for the delivery unit 18. FIG. 2 therefore shows, in particular, a circumferentially corrugated housing which has an adaptable length and/or height and thus makes adaptability of the length 9 of the discharge line 8 possible.

Figure 3:
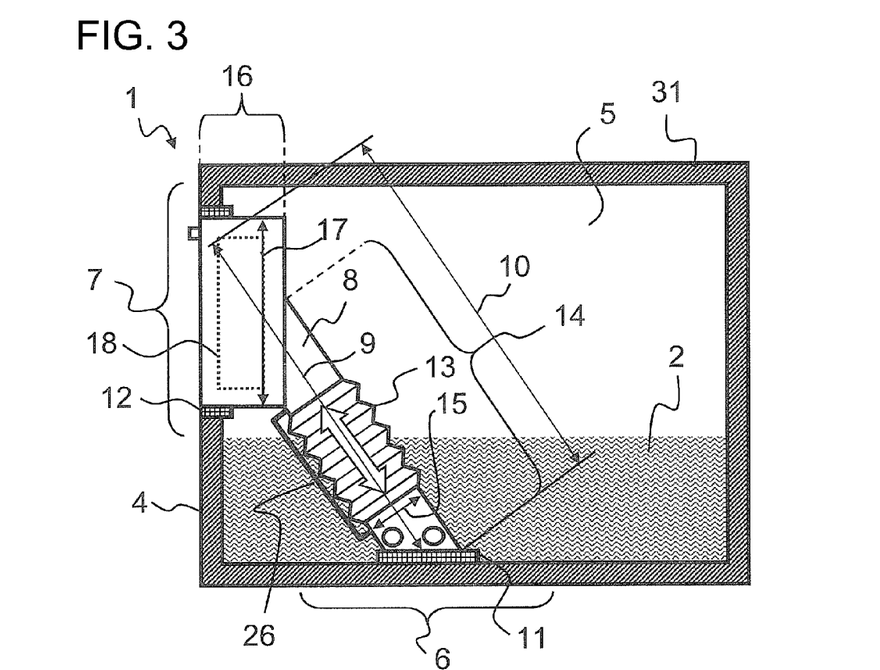
FIG. 3 is a vertical-sectional view of a third structural variant of a container according to the invention.
Figure 4:
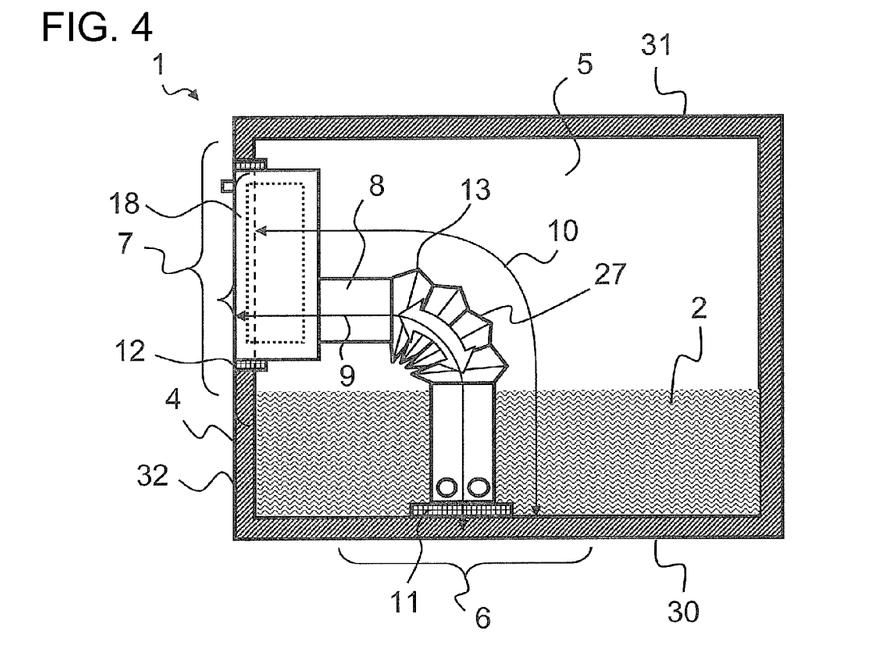
FIG. 4 is a vertical-sectional view of a fourth structural variant of a container according to the invention.

Whereas, in FIG. 1 and FIG. 2, the first wall section 6 is disposed in each case on an underside 30 of the container 1 and the second wall section 7 is disposed on a top or upper side 31 of the tank wall, FIG. 3 and FIG. 4 show containers 1, in which the first wall section 6 is disposed in each case on the underside 30 of the container 1, whereas the second wall section 7 is situated in each case on a side wall 32 of the container 1. According to FIG. 3, the discharge line 8 extends obliquely through the container 1. Moreover, FIG. 3 shows a fixing device 26 which restricts the variability of the length 9 of the discharge line 8. The discharge line 8 according to FIG. 3 thus stiffens the container 1. The discharge line 8 deliberately restricts the deformability of the container 1 to a particularly pronounced extent, in particular because the discharge line 8 is disposed obliquely in the container 1.

In FIG. 4, the discharge line 8 is provided with a curvature 27 in the corrugated section 13. The corrugated section 13 is configured in this case in such a way that the discharge line 8 can be bent. As a result of a discharge line 8 which is configured in this way, a particularly flexible adaptation of the discharge line 8 to differently shaped containers 1 can take place.

Figure 5:
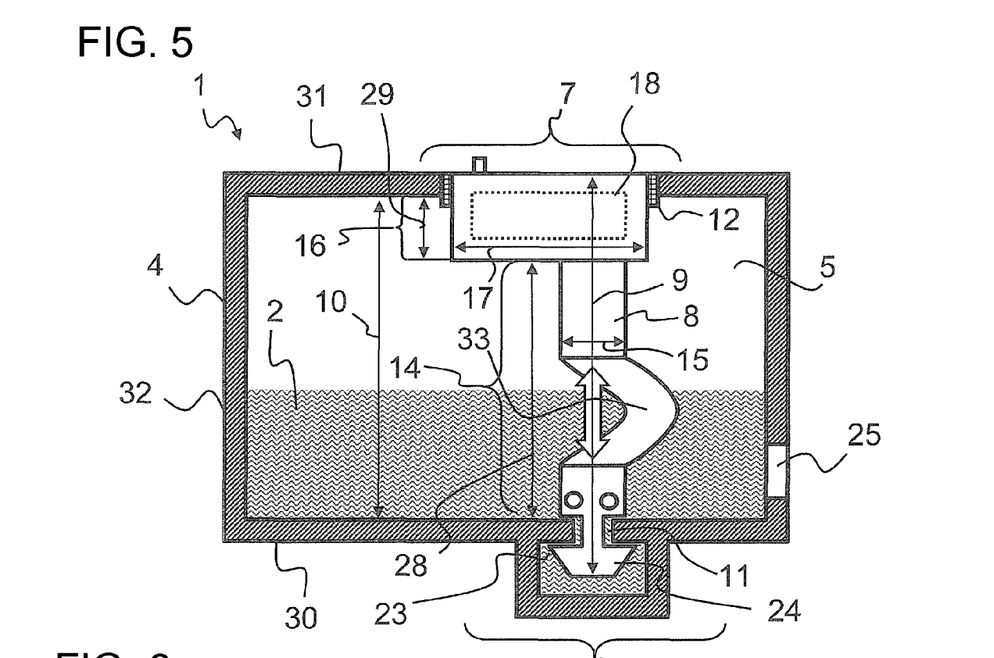
FIG. 5 is a vertical-sectional view of a fifth structural variant of a container according to the invention.
Figure 6:
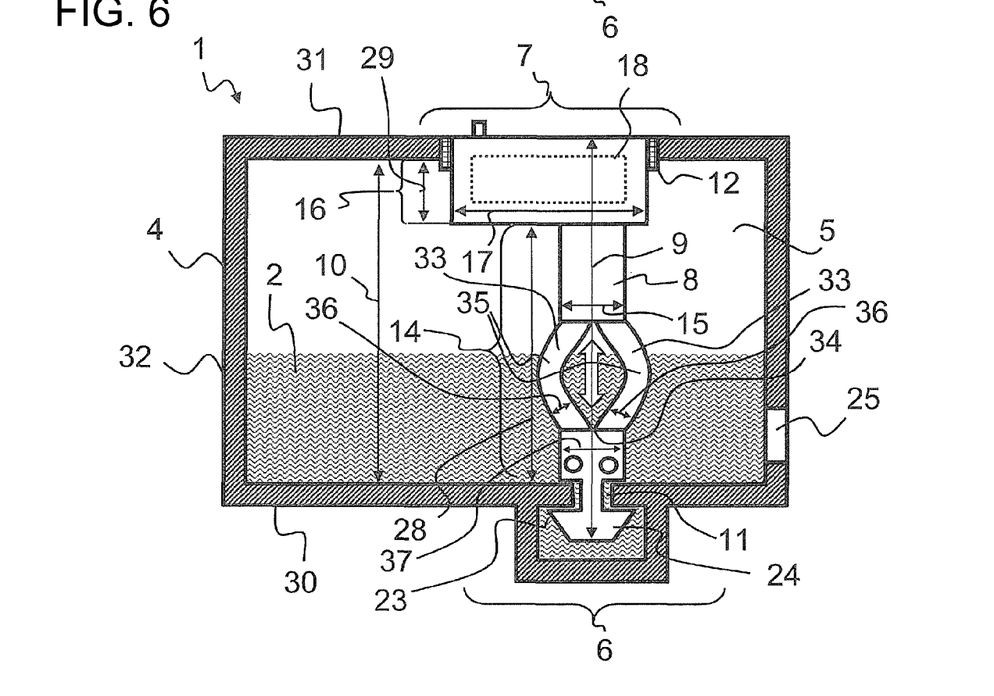
FIG. 6 is a vertical-sectional view of a sixth structural variant of a container according to the invention.

FIGS. 5 and 6 show other embodiments of the discharge line 8, by way of which an adaptation of the length 9 can be achieved even without a corrugated section.

The discharge line 8 in the container 1 according to FIG. 5 has a loop 33, through which the discharge line 8 is given its flexibility. Through the use of a loop 33 of this type, the discharge line 8 can change its length 9, without a pronounced local deformation of the discharge line 8 and/or of the material of the discharge line 8 being required for this purpose.

The discharge line 8 in the container 1 according to FIG. 6 has a branch 34. The discharge line 8 is branched in regions into two parallel (separate) legs 35. The individual legs 35 in each case have a second cross section 36 which is smaller than the first cross section 37 of the remaining discharge line 8. In addition, both legs 35 have a loop 33. A particularly satisfactory deformability of the discharge line 8 can thus be achieved, with the result that the length 9 is variable.

Figure 7:
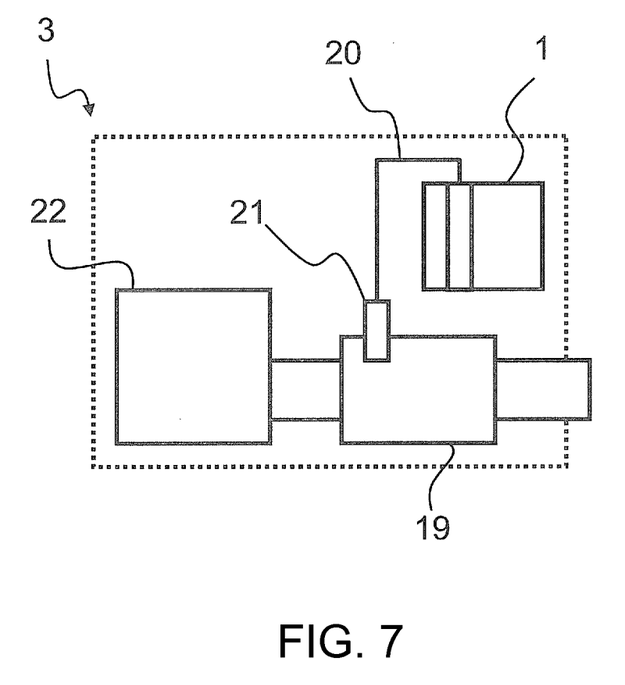
FIG. 7 is a vertical-sectional view of a motor vehicle, having a container according to the invention.

FIG. 7 shows a motor vehicle 3, having an internal combustion engine 22 and an exhaust gas treatment device 19 for the purification of the exhaust gases of the internal combustion engine 22. The exhaust gas treatment device 19 has an injector 21 for feeding in a reducing agent. The injector 21 is supplied with reducing agent through a line 20 leading out of a container 1.

The invention claimed is:

1. A method for producing a container, the method comprising the following steps:
   a) providing a container without a discharge line but with a container wall having a first wall section and a second wall section defining a spacing therebetween;
   b) providing a discharge line with a variable length;
   c) fixing the discharge line on the first wall section of the container wall;
   d) adapting the variable length of the discharge line to the spacing between the first and second wall sections of the container wall;
   e) fixing the discharge line on the second wall section; and
   fixing the length of the discharge line after step e) to stiffen the container between the first wall section and the second wall section using the discharge line.

2. A container for an operating liquid of a motor vehicle, the container comprising:
   a container wall delimiting an interior space of the container, said container wall having a first wall section and a second wall section defining a spacing therebetween;
   at least one discharge line configured to discharge the operating liquid out of the container, said at least one discharge line extending from said first wall section to said second wall section, said at least one discharge line having a length and said at least one discharge line configured to adapt said length to said spacing between said first wall section and said second wall section;
   a first receptacle disposed in vicinity of said first wall section and configured to receive said at least one discharge line;
   a second receptacle disposed in vicinity of said second wall section and configured to receive said at least one discharge line;

said first receptacle and said second receptacle configured to transmit forces from said container wall to said at least one discharge line; and a fixing configured to fix an adapted length of said discharge line.

3. The container according to claim 2, wherein said container wall is formed of plastic and said at least one discharge line is formed of metal.

4. The container according to claim 2, wherein said at least one discharge line is configured to be locked and unlocked on said container wall.

5. The container according to claim 2, wherein said at least one discharge line has at least one corrugated section configured to adapt said length of said at least one discharge line.

6. The container according to claim 1, which further comprises:

a delivery unit for the operating liquid;

said at least one discharge line having a first section with a first diameter and a second section with a second diameter;

said second diameter being larger than said first diameter; and said delivery unit being provided in said second section.

7. A motor vehicle, comprising:

at least one operating liquid container according to claim 2; and a delivery unit configured to convey the operating liquid out of the container through the at least one discharge line.

* * * * *